April 16, 1935. T. A. NOVOTNEY ET AL 1,998,167
HEATING APPARATUS
Filed Sept. 28, 1933 4 Sheets-Sheet 1
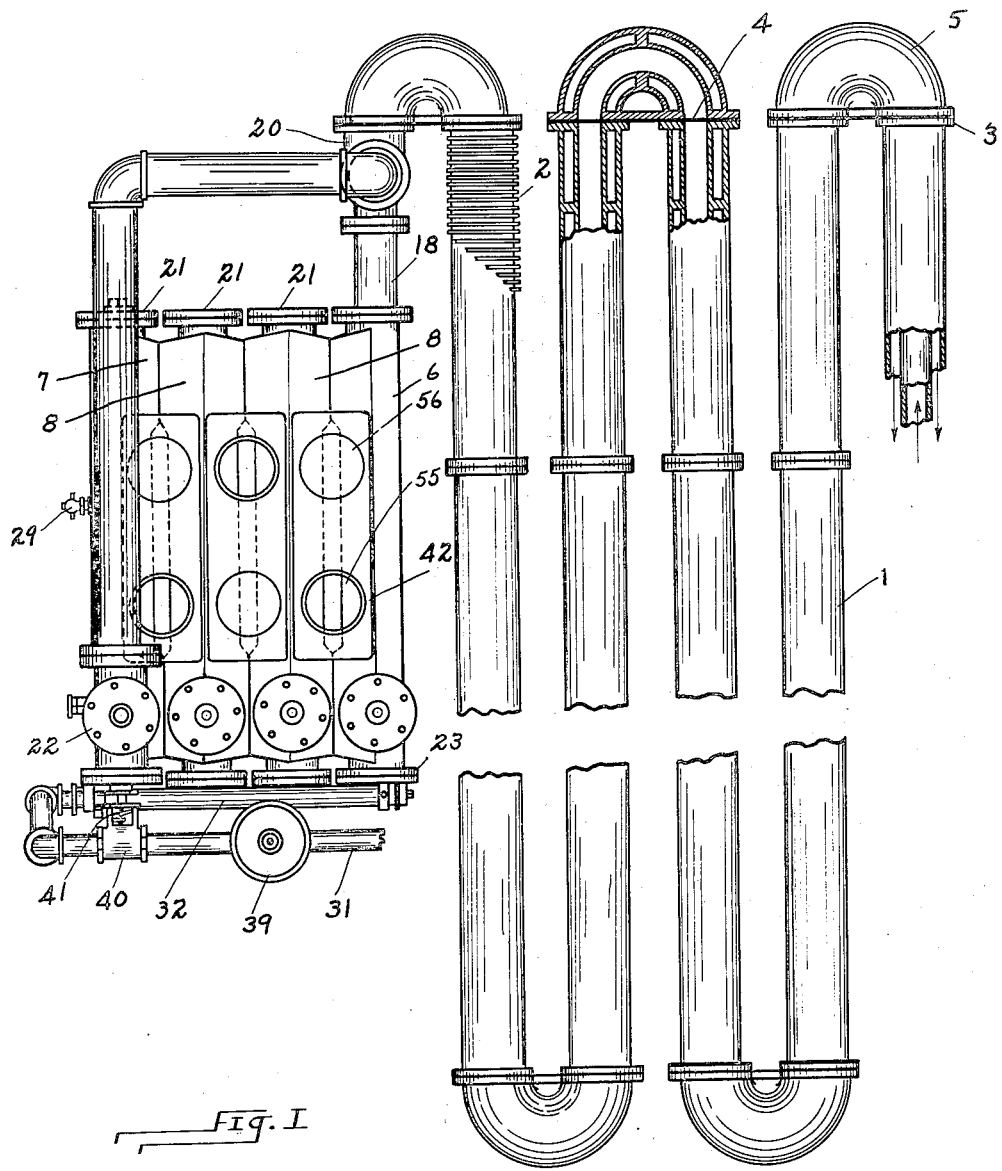
Fig. I
INVENTORS
Thomas A. Novotney
Louis N. Hunter
by Christy Christy and Wharton
their attorneys

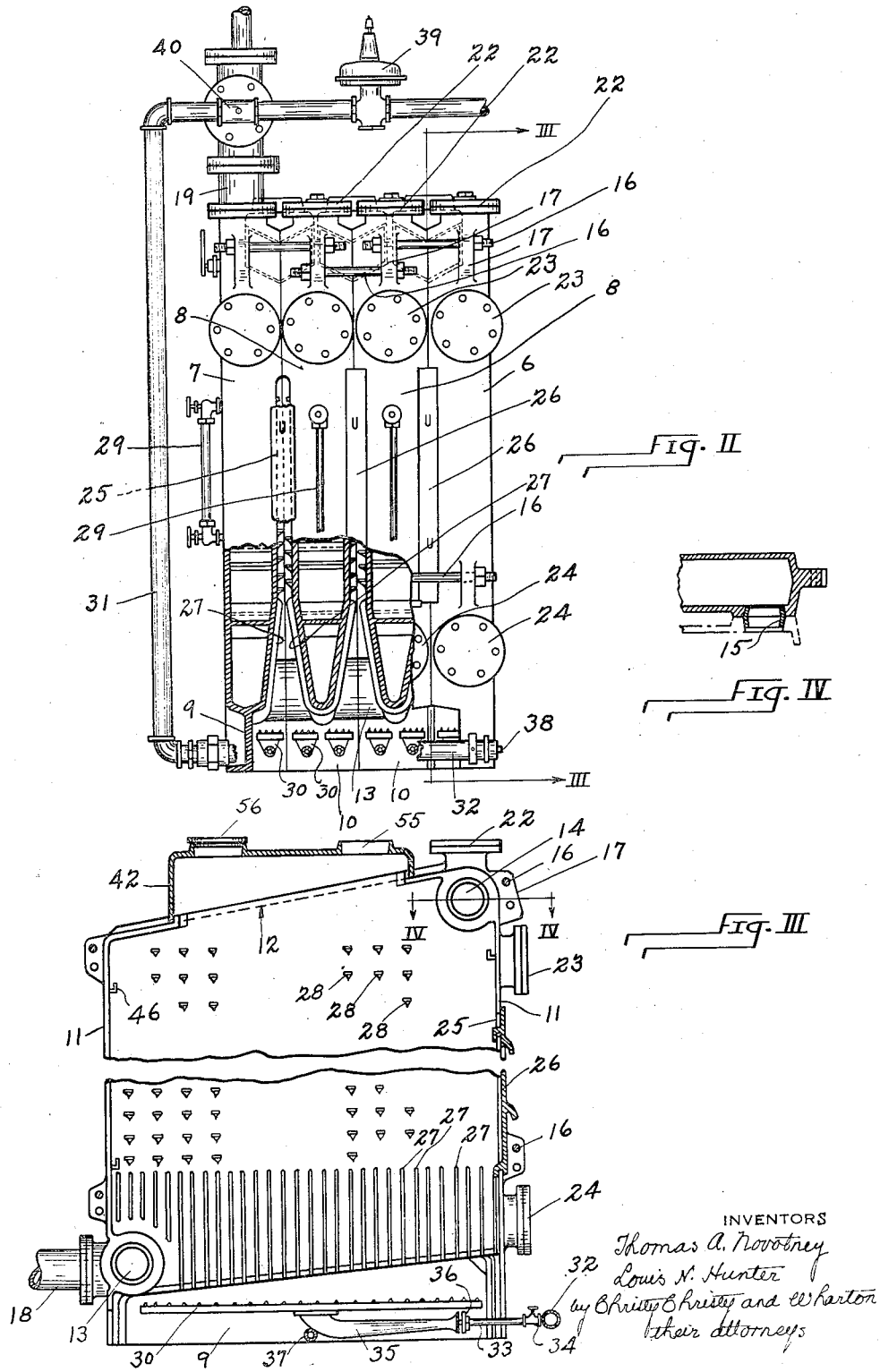

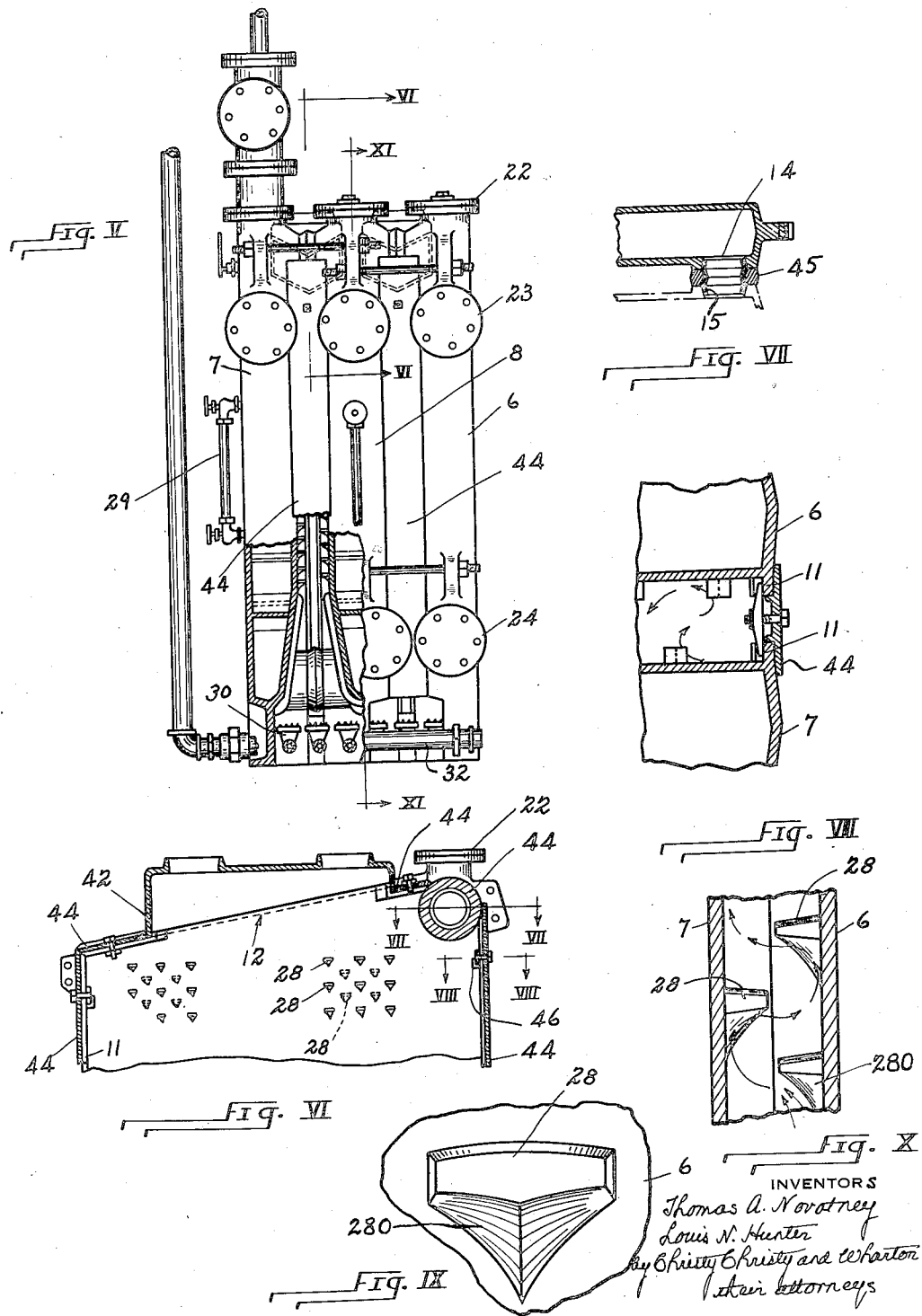

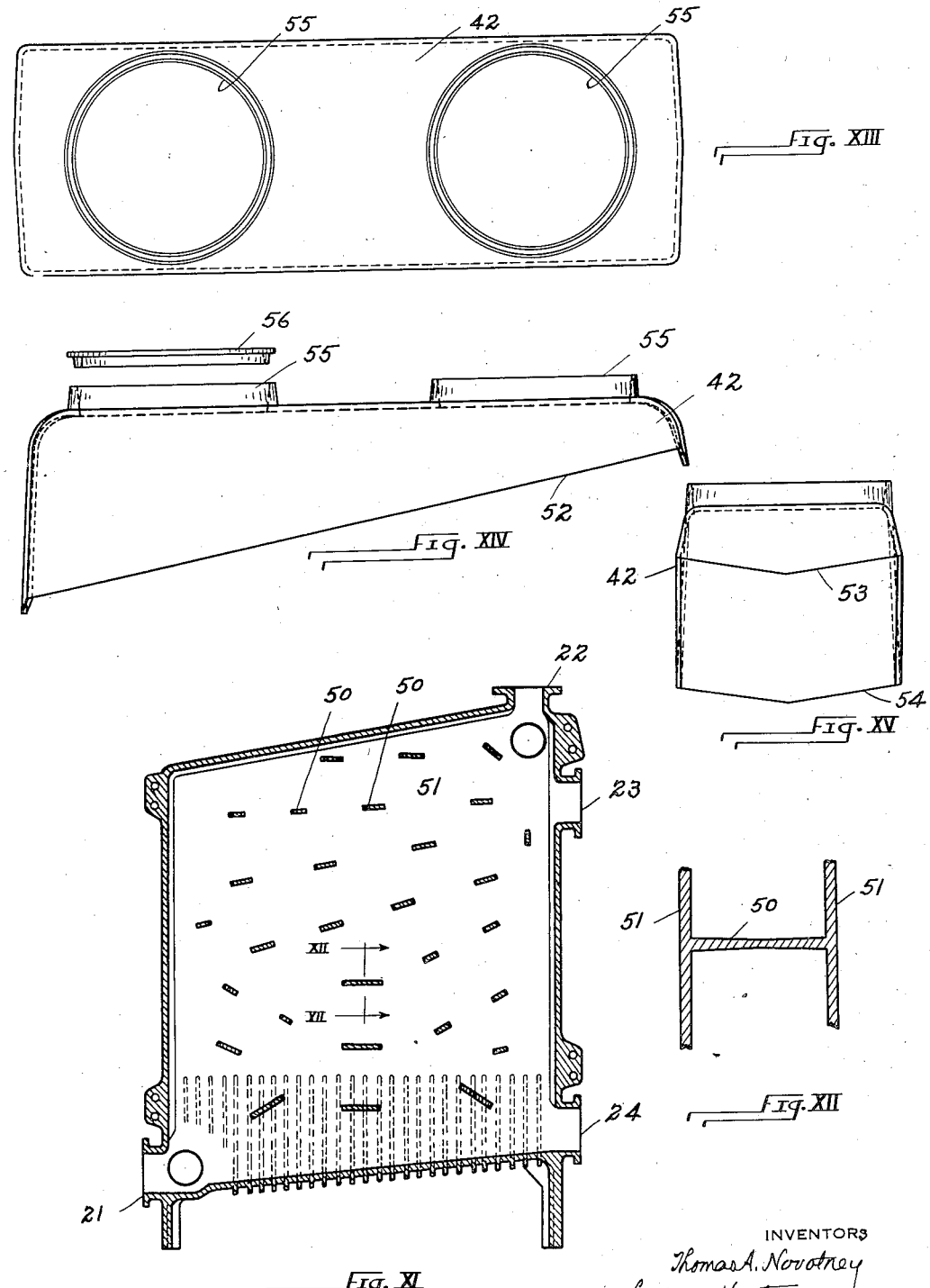

Patented Apr. 16, 1935

1,998,167

UNITED STATES PATENT OFFICE 1,998,167

HEATING APPARATUS

Thomas A. Novotney and Louis N. Hunter, Johnstown, Pa., assignors to National Radiator Corporation, a corporation of Maryland Application September 28, 1933, Serial No. 691,338

5 Claims. (Cl. 122—210)

This invention relates to heating apparatus, and the objects in view are economy in and adaptability of structure and efficiency in service. It is generally applicable for the heating of liquids, whether the liquid serve as a medium merely, for transferring heat and imparting it to another relatively cold body of liquid or gas; or whether liquid itself, in consequence of heating, undergo some desired change of condition.

In a companion application for Letters Patent, now allowed, Serial No. 610,730, filed May 11, 1932, now matured into Patent 1,968,614, granted July 31, 1934 the heater of this invention is shown and described in its application to the treatment of an emulsion, to effect the breaking up of the emulsion and the segregation of the components; and in that application the method of treating emulsions is claimed. The invention of the present application lies in the heater structure, whether employed for treating an emulsion, or for such other purpose as those herein indicated.

In the accompanying drawings Fig. I is a view in plan from above of an installation in which the heater of the invention forms part of apparatus for treating petroleum that carries water in emulsified condition, and for effecting separation of the water from the petroleum; Fig. II is a view, partly in front elevation, partly in vertical section of the heater of such emulsion-treating apparatus; Fig. III is a view in section, on the plane indicated by the line III—III, Fig. II; Fig. IV is a fragmentary view in horizontal section, on the plane indicated at IV—IV, Fig. III; Fig. V is a view similar to Fig. II, but showing a modification in structure, and a variation in the assembly of the units of which this heater is built up; Fig. VI is a fragmentary view in vertical section, on the plane indicated at VI—VI, Fig. V; Figs. VII and VIII are fragmentary views in horizontal section, on the planes indicated at VII—VII and VIII—VIII (Fig. VIII being drawn to somewhat larger scale); Figs. IX and X are views to still larger scale and serve to illustrate in front and side elevation a particular novel configuration of the surface of a wall which forms a limiting surface of a flue. Fig. XI is a view in vertical section, on the plane indicated at XI—XI, Fig. V; Fig. XII is a fragmentary view in section, and drawn to larger scale, on the plane XII—XII, Fig. XI. Figs. XIII, XIV, and XV show to larger scale, and in plan from above, in side elevation, and in end elevation, a flue top, which forms part of the structure of the heater.

Attention is directed, first, to the treatment of petroleum, and to the apparatus of Figs. I–XV. The petroleum emulsion after it comes from the ground is carried, preferably by gravity flow, in a suitable conduit in a loop-formed course, with the branches of the loop in heat-interchanging relation, and the heating apparatus of the present invention is arranged in the turn of the loop. Within this heating apparatus, the velocity of flow is, because of increase in the cross-sectional area of the conduit, diminished, and heat is applied, with the effect that the water carried in emulsified condition is precipitated. The precipitated water accumulates, and the heater chambers are so shaped as to retain water so accumulating in a pool; and the oncoming stream of emulsion is caused to rise through the pool of water. In so rising through the heated water, the entering emulsion is more rapidly and completely stripped of its burden of water; precipitation is more completely accomplished. Not only so, but by virtue of the particular structure of the heater the stream is subdivided into a plurality of parts, and each part or subdivision is dealt with in the manner indicated, with the consequence and effect that operation is expedited and rendered more complete. After precipitation and separation have been effected, the unburdened and now heated petroleum is returned through the heat exchanger and at reduced temperature is delivered at length to a suitable receiver, ordinarily a tank open to the air. It will be delivered at or substantially at atmospheric temperature, and there will be no substantial loss of readily volatilizable fractions. Although the petroleum as it flows through the return branch of the loop will already have been relieved of all or substantially all of its burden of water in emulsified condition, it may, and as operation progresses it inevitably will, carry with it water. The water so carried will, however, be in aggregated condition, in the form of "slugs" within the conduit; and the water so carried will readily separate gravitationally from the oil when both come into the receiving tank.

Referring, first, to Fig. I of the drawings, a long, double-chambered pipe 1 is provided, of which the inner, central chamber will be understood to be the conduit for the incoming stream of petroleum emulsion (the entering branch of the loop) and the outer, concentrically arranged chamber will be understood to be the conduit for the outgoing stream of unburdened petroleum (the delivery branch of the loop). The stream of emulsion as it enters this conduit (at the right-hand end, Fig. I) will ordinarily be at atmospheric temperature; the return stream of unburdened petroleum as it enters the opposite end (the left-hand end) of this double-chambered pipe is at high temperature (at about 200° F., as the operation is ordinarily conducted); and as the two streams flow counter-current through the double-chambered pipe, heat will pass from one stream to the other until the entering emulsion passing from the left-hand end of pipe 1 has been brought to an elevated temperature (140° F., more or less) and the outflowing petroleum has been brought approximately to atmospheric temperature.

The heat-exchanger constitutes the conduit for the two branches of the loop-formed stream in which the material under treatment is caused to flow. In the turn of the loop the heating apparatus is situated. Within it the conduit for the flowing stream of petroleum is greatly increased in cross-sectional area, in consequence of which the velocity of flow (high velocity has value for heat-exchange purposes) is greatly reduced (low velocity has value for purposes of separation). Furthermore, within this heating apparatus the stream is subdivided into a plurality of parallel fractional streams, and this is advantageous both in facilitating and hastening the desired separation, and in making available a sectional and "elastic" structure; so that, in every particular installation, the number of sections employed may be suited to the circumstances.

The sections which in the turn of the loop constitute the conduits for the subdivided stream are assembled, and in assembly they together constitute the heater, with fire-box and flues. In this heater the entering emulsion is subjected to those conditions of heat and percolation which accomplish the desired separation.

The sections are of three specific shapes—right-end sections 6, left-end sections 7, and intermediate sections 8—and in every installation two at least of these three shapes are assembled (the right- and left-end sections); and, if there be intermediate sections, the number to these may vary indefinitely. The assembly of Figs. I and II is an assembly which includes with the two end sections two intermediate sections; the assembly of Fig. V includes but one intermediate section. Each section is a chambered casting (of cast-iron), adapted to stand in the position indicated, of relatively great height and depth, but of relatively small breadth. The end sections are provided at their lower edges with flanges 9 which extend throughout their depth and across their breadth; the intermediate sections are provided at their lower edges with flanges 10, 10, which extend across their breadth at front and rear only; and all of the sections are provided, on those sides which in the assembly stand face to face with the sides of other sections, with marginal flanges 11. At the upper ends of the sections, however, the marginal flanges 11 are interrupted by spaces 12. When, therefore, two or more appropriate sections are assembled, the flanges 9 and 10 form the continuous side-walls of a fire-box, and the sides of the sections, spaced apart by the flanges 11, constitute a flue or flues which lead upward from the fire-box, while the spaces 12 form passageways through which products of combustion may escape to a suitable chimney.

The sections are provided, in the sides which in the assembly stand face to face with the sides of other sections, each with a nipple port 13 at the bottom and a nipple port 14 at the top. Push nipples 15 are set in these nipple ports of aligned sections, and assembly is effected and the heater completed by drawing the sections together and securing them with flanges 11 in abutment and with push nipples in place, by means of heavy pull-rods 16 which engage perforate lugs 17 formed externally upon the sections. The top of the assembled heater is conveniently inclined, as indicated in Fig. III, and the nipple ports 14 are advantageously situated precisely at the highest point of the assembly.

With particular attention to Figs. II and III, it will be perceived of the chambers of the sections that, whereas they are elsewhere of uniform breadth, toward their lower ends they are tapered; and that, accordingly, in this portion of the assembly the flues formed by and between the sections widen downwardly and merge in the fire-box. The bosses that surround the nipple ports 13 accordingly are of greater height than those that surround the orifices 14; but these bosses rise substantially to a common plane coincident with that in which the edges of the flanges 11 extend.

One of the sections (the end section 6, as here shown) is provided, at its lower end, with an inlet opening where, through pipe connection 18, the stream flowing through the central passageway of the heat-exchanger may have entrance; and another section (the end section 7) is provided, at its upper end, with an outlet opening where, through connection 19, the returning stream may pass to the outer passageway of the heat-exchanger. Through an appropriate pipe connection 20 of known form secured to the terminal unit of the heat-exchanger the indicated course of circulation is completed.

In the assembly the aligned bosses which surround the nipple ports 13 and 14 constitute, in effect, internal headers, and the stream of material under treatment passes in subdivision through the assembled sections, from header to header. Any tendency toward delay of flow through one section relatively to the others will have the effect of increase of temperature of the material within that section; and the effect of such increase of temperature must be acceleration of flow in that section. Thus automatically distribution of flow in the sections is accomplished.

In addition to the openings to and from which the pipe connections 18 and 19 lead, the sections are provided with flanged openings capped as indicated at 21, 22, 23, 24, through which, the caps being removed, and without other disturbance of assembly, the interior of the sections is accessible for cleaning. And, manifestly, baffles may be formed within the sections, so arranged as to leave spaces accessible for cleaning. The lower flanged openings, 21 and 24, are available for drainage; and the upper, 22 and 23, for vapor take-offs.

A preferred arrangement of baffles within the sections is illustrated in Figs. XI and XII. The baffles 50 bridge the space between the opposite walls 51 of the section; they are elongate in cross-section, and they are arranged in lines with spaces between that radiate from the openings 21, 22, 23, and 24.

Tappings may be made through the walls of the sections, for gauge glasses, such as are indicated at 29.

The continuity of the flanges 11, interrupted above to form chimney passages 12, is interrupted in front also to form clean-out openings 25. Removable cover plates 26 are provided for these openings, and when these are removed the flues formed by and between the sections are accessible for cleaning.

The flue-defining surfaces of the sections are minutely shaped to afford maximum absorption of heat and consequently maximum heating effect upon the material under treatment. Already it has been explained that the sections are at their lower ends tapered to form passageways which narrow upwardly from fire-box to flue; and in this portion of their extent the external surfaces of the sections are provided with outstanding closely set vertically extending ribs 27. In the higher portions, where the walls of the sections extend in substantially parallel planes, the external surfaces are provided with outstanding bosses 28, shaped as shown in Figs. IX and X, and arranged as indicated in Figs. VI and X. Each boss is tapered from a relatively broad base upwardly and outwardly, and presents to the ascending stream of flame curved surfaces 280, shaped like a double plowshare, which tend to divide the rising stream, and to deflect the two branches in opposite directions laterally, and at the same time outwardly and away from the surface from which the boss rises.

The assembly of bosses upon each surface is in rows of both vertical and horizontal alignment, as indicated in full lines, Fig. VI; but, as between the opposite walls which define each flue, the sets of bosses are staggered. In Fig. VI the positions of the bosses on the opposite side of the flue are indicated in dotted representation; and this relative position will be made additionally plain on considering Fig. X. Given such formation and arrangement of bosses, and realizing too that in the assembly now particularly under consideration the bosses rise nearly to the meeting plane of the flanges 11, the effect of the bosses will be both to subdivide the rising stream of flame and to throw the subdivisions into helical whirls. The streams of flame so set whirling sweep again and again over the wall surfaces and more fully give up to the metal walls their burden of heat.

The assembly of a plurality of sections forms, at the base of the assembly, a fire-box, in which a burner or burners 30 are arranged, and, rising from the fire-box, one or more flues. Gas is brought through a supply pipe 31 to a manifold 32. This, in the particular installation illustrated, is a length of two-and-a-half-inch, extra heavy, spellerized steel pipe. From the manifold, branch pipes 33 lead (one for each burner), and flow through each branch pipe is controlled by a cock 34. Each branch pipe terminates in an orifice of proper size and each discharges into a mixing tube 35. The mixing tube is preferably of Venturi type, and will conveniently be formed of cast-iron. An adjustable mixing shield 36 is provided, for the usual purpose of regulating the proportions of the combustible mixture which reaches the burner. From the mixing tube the aerated gas flows to and through the burner 38. The burner rests on the mixing tube, and the mixing tube in turn rests on a support 37 provided for it. The cap upon one end of the manifold 32 is provided with a tap 38, to which a manometer may be connected, for measuring gas pressure.

A pressure regulator 39 is set in the line of gas supply, to reduce high line pressure to a pressure suitable for the burners; and, as a matter of detail of actual operation, the burner equipment is such as to operate at the comparatively low pressure of 5 inches of water pressure, and that means a pressure of about 3 ounces in the manifold. The burner will, however, operate efficiently at much lower pressure; and there may be a considerable range of fluctuation in line pressure, without prejudice to the successful operation of the burner.

A throttle valve is introduced in the gas supply line, between the regulator and the manifold, and this valve is controlled by a thermostat arranged in the stream of oil as it passes from the bend of the return branch. The casing for this valve is indicated at 40 and the thermostat rod at 41. The gas supply is by this valve so controlled that the outlet temperature of the oil is maintained constant; and the thermostat may, in well-known manner, be so adjusted as to fix that constant temperature at will at any desired degree within a wide range.

Upon the assembled sections and surrounding each of the openings 12 is set a cast-iron flue top 42.

In operation the flames from the burners rise through the flues formed by and between the adjacent sections and the products of combustion pass out through the draft diverters. The flames as they rise are, by the assembly of bosses 28, subdivided and directed into whirling streams, with the consequence and effect that they give up heat more rapidly to the section walls and to the bodies of liquid within the sections. The emulsion streams in through pipe connection 18 and enters the sections, and from the sections the petroleum relieved of its burden of water streams out through pipe connection 19. The temperature of the material under treatment will ordinarily approximate but will not ordinarily greatly exceed the boiling point of water, as a maximum. The sections themselves are at all times filled with liquid, and within them, under the influence of heat, the incoming emulsion is continuously being dissociated. The velocity of the stream is within these sections greatly reduced, and in consequence the water (ordinarily, salt water) precipitated from emulsion collects by gravity in pools in the lower part of the sections and the oil relieved of its burden rests upon the pools of water; and as operation progresses, the entering emulsion, introduced at the lower ends of the sections, and ascending, percolates through the pools of hot salt water, and such penetration of the salt water by the emulsion expedites the separation of the emulsified water from the petroleum which carries it. Through the gauges 29 the heights at which the pools of salt water stand may be observed, and, by drawing off the excess, the best conditions of operation may be maintained. As has been said, tendencies to inequalities of circulation through the sections automatically correct themselves.

The sectional structure of the heater which has been described admits of a structural adaptation suiting the apparatus to either of two conditions of use. The sections may be assembled, spaced apart at wider intervals with spacer panels 44 between, as illustrated in Figs. V-VIII, and with spacer rings 45 inserted to retain a plurality of aligned push nipples 15 connecting aligned orifices 14. The spacer panels are applied externally, and are bolted to place, spanning the intervals between the flanges 11 of adjacent sections; and the sections are provided with brackets 46, upon which the vertically disposed panels 44 may be supported. Change from the assembly of Figs. I-IV to that of Figs. V-VIII may be effected by removing the flue tops 42, separating the sections, and assembling them again with the panels 44, the rings 45 and the additional push nipples properly introduced and then applying another flue top of suitable proportions. In places where the cost of gas is great, the arrangement shown in Figs. I-IV will be preferred, and this arrangement may be characterized as that of high efficiency; but where the cost of gas is small, and perhaps negligible, the arrangement shown in Figs. V-VIII may be preferred. This arrangement has a capacity of output 75% greater than the arrangement of Figs. I–IV, and may be characterized as that of high capacity. This greater capacity, however, may be realized, only by sacrifice of efficiency.

It will be remarked of the sections 6, 7, and 8 that they are ridged above, after the manner of the roof of a building; and of the flue tops 42 that they are correspondingly shaped, with long inclined side edges 52, and terminal V-shaped end flanges 53, 54. These flue tops seat themselves snugly upon the assembly and enclose the openings 12. And whether the sections be assembled in the close spacing of Fig. II, or in the wider spacing of Fig. V, the same flue-tops (being constructed of sufficient width) may be applied to rest in like manner upon the assembled sections, and to serve with like effect. The flue-top, however, will be seen to be provided above with two orifices 55, 55; and a pate 56 may be provided, adapted when applied to constitute a closure of one of the orifices. When the sections are assembled in close spacing (Figs. I–III), one of the orifices 55 of each flue-top may be closed by a plate 56.

The apparatus is advantageously (though not necessarily) so situated that flow of liquid through it is effected by gravity, and to such end the emulsion may be conducted from a tank arranged at higher level and the unburdened petroleum may be delivered to a tank at lower level.

These are characteristic features of the apparatus of the invention: the breaking-down of the emulsion is accomplished solely by the application of heat, under the conditions described; vaporization losses of the oil are prevented by bringing the treated oil approximately to atmospheric temperature, before exposing it to atmospheric conditions; both the heat-exchanger portion and the heater portion of the apparatus are built up of sections and by the building up of sections the apparatus is "elastic", and, being composed of standard parts, may be suited in size to the requirements of any particular place of service, and may be varied to suit changing requirements; parts are interchangeable; the parts of the entire equipment may be taken down, removed, and reassembled, so that in moving from one lease to another, salvage is complete; in the case of a growing development, it is possible to begin with equipment adequate to early needs and to enlarge indefinitely as needs increase; the intermediate sections and the end sections as well are adequately supported, so that there is no limit imposed by necessity of proper support to the number of sections that may be included in a single assembly; no housing is required; the interior and exterior surfaces of the component sections are readily accessible for cleaning; particularly, the sections of the heater portion are accessible interiorly for the cleaning out of sludge and other accumulations, and the spaces between the sections which constitute the gas passages are accessible without tearing the assembly down for the removal of deposits on the walls; the heater may be assembled either as a high-capacity installation or as a high-efficiency installation, as circumstances dictate; the temperature is automatically controlled, and consequently constant attendance is not required; while we have described gas as proper fuel, manifestly fuels of other character—solid, liquid, or gaseous—may, with obvious adaptations, be employed; the apparatus may be formed of cast-iron, and thus rendered highly durable; in consequence of such durability, shut-down for repairs is infrequent; when repair is necessary, the parts are accessible for ready replacement.

We claim as our invention:

1. A heater structure including a plurality of marginally flanged sections, together with spacer panels, two adjacent sections being adapted to be assembled either with marginal flanges in immediate abutment or with flanges in abutment upon spacer panels interposed between them, each section being internally chambered, and two adjacent assembled sections constituting opposite walls of a passageway for a heating medium, such passageway being wide or narrow according as the spacer panels are present or absent.

2. The assembly of claim 1, together with a flue top, the sections being ridged and the flue top being provided with V-shaped end flanges, whereby in assembly the flue top is adapted to rest with snug fit upon the assembled sections, whether the panels be present or absent, and to enclose at the upper end a passageway between two assembled sections, and to constitute a flue for such passageway, the flue top being adapted so to rest upon and form an organization with two assembled sections, whether the sections be assembled in immediate contact, or with spacer panels between.

3. In a heater construction two bodies with opposed parallel and vertically extending surfaces, constituting the opposite walls of a flue for a heating medium, the bodies over said surfaces being provided with outstanding bosses, each boss individually tapering from its base outwardly and having curved lower faces of plowshare form, and the grouping of the bosses as between the opposed surfaces being in staggered rows, whereby an ascending stream of heating medium is by the bosses caused to flow in spiral course.

4. A heater structure of sectional and elastic character including a plurality of sections having end walls of relatively great extent and side walls of relatively small extent in the direction of the length of the assembly, close set in lateral succession, with end walls of adjacent sections arranged in face-to-face positions and with flues between (said sections intercommunicating at the bottom and at the top, each section being provided in its side walls with a cleaning opening and each section being provided interiorly with elongate baffle plates bridging the space between the end walls, the baffle plates being arranged in lines and defining channels that radiate from such cleaning opening.

5. In a heater construction two bodies with opposed vertically-extending surfaces, constituting the opposite walls of a flue for a heating medium, the bodies over said surfaces being provided with outstanding bosses, the two groups of bosses provided upon such opposite walls being in the assembly arranged in staggered relationship, the bosses individually being provided with surfaces that are oblique with respect both to the vertical plane perpendicular to the flue wall and to the vertical plane parallel to the flue wall, whereby deflection of the stream of gases advancing through such flue is effected, both laterally and at the same time outwardly and away from the wall surface from which the boss rises.

THOMAS A. NOVOTNEY.
LOUIS N. HUNTER.